(12) United States Patent
Foti

(10) Patent No.: US 12,010,154 B2
(45) Date of Patent: Jun. 11, 2024

(54) SUPPORT FOR IMS VIRTUAL CLIENTS IN MULTI-OPERATOR ENVIRONMENT

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 127 days.

(21) Appl. No.: 17/054,834

(22) PCT Filed: May 8, 2019

(86) PCT No.: PCT/IB2019/053794
§ 371 (c)(1),
(2) Date: Nov. 12, 2020

(87) PCT Pub. No.: WO2019/220274
PCT Pub. Date: Nov. 21, 2019

(65) Prior Publication Data
US 2021/0218780 A1 Jul. 15, 2021

Related U.S. Application Data

(60) Provisional application No. 62/672,049, filed on May 15, 2018.

(51) Int. Cl.
*H04L 65/1069* (2022.01)
*H04L 65/1016* (2022.01)
(Continued)

(52) U.S. Cl.
CPC ...... *H04L 65/1069* (2013.01); *H04L 65/1016* (2013.01); *H04L 65/1063* (2013.01); *H04L 65/1073* (2013.01)

(58) Field of Classification Search
CPC ............. H04L 65/1016; H04L 65/1063; H04L 65/1069; H04L 65/1073; H04L 61/30
See application file for complete search history.

(56) References Cited

U.S. PATENT DOCUMENTS 9,369,430 B2    6/2016   Dahlin et al.
2005/0286531 A1\* 12/2005   Tuohino .................. H04L 45/30
370/395.2

(Continued)

FOREIGN PATENT DOCUMENTS

WO    WO-2016050032 A1 \*   4/2016           H04L 29/06

OTHER PUBLICATIONS

Ericsson et al., "Support for Identity Attestation and Verification", SA WG2 Meeting #124, Reno, USA, Nov. 27, 2017, pp. 1-10, S2-179243, 3GPP.

(Continued)

*Primary Examiner* — Lesa M Kennedy
(74) *Attorney, Agent, or Firm* — Sage Patent Group

(57) ABSTRACT

This disclosure provides techniques to support Internet Protocol (IP) Multimedia Subsystem (IMS) virtual clients (14) in a multi-operator environment. More specifically, the present disclosure provides new subscription types that can be utilized for serving IMS clients in enterprise communication systems. The improved type of subscription enables compatible IMS service providers (16, 18) to comprehend an enterprise-generated domain name in SIP sessions, where the enterprise-generated domain name is different than the explicit domain name corresponding to the IMS service provider. This ensures that an enterprise IMS node/client can obtain an IMS Public User Identity (IMPU/IMP) and use the domain name for a particular IMS service provider that was obtained by the enterprise to refer to the IMS service provider used for handling the session for the IMPU.

20 Claims, 15 Drawing Sheets

(51) Int. Cl.
*H04L 65/1063* (2022.01)
*H04L 65/1073* (2022.01)

(56) References Cited

U.S. PATENT DOCUMENTS

| | | | | |
|---|---|---|---|---|
| 2010/0118860 A1* | 5/2010 | Dahlin | ................ | H04L 61/2596 370/352 |
| 2010/0299420 A1* | 11/2010 | Dahlin | .................... | H04L 41/18 709/222 |
| 2012/0203879 A1* | 8/2012 | Merino Vazquez | ......................... | H04L 65/1016 709/223 |

OTHER PUBLICATIONS

3rd Generation Partnership Project, "3rd Generation Partnership Project; Technical Specification Group Core Network and Terminals; Numbering, Addressing and Identification", Technical Specification, 3GPP TS 23.003 V15.3.0, Mar. 1, 2018, pp. 1-118, 3GPP.

Islam, S. et al., "Converged Access of IMS and Web Services: A Virtual Client Model", IEEE Network, Jan. 1, 2013, pp. 37-44, IEEE.

3rd Generation Partnership Project, "3rd Generation Partnership Project; Technical Specification Group Services and System Aspects; IP Multimedia Subsystem (IMS): Stage 2 (Release 15)", Technical Specification, 3GPP TS 23.228 V15.2.0, Mar. 1, 2018, pp. 1-330, 3GPP.

European Communication Art. 94(3) for EP Application No. 19725872.6 dated Dec. 7, 2022, 8 pages.

3GPP, Technical Specification Group Services and System Aspects, "Service Requirements for the Internet Protocol (IP) Multimedia Core Network Subsystem (IMS)" Stage 1 (Release 15), 3GPP TS 22.228 V15.2.0 (Sep. 2017), 51 pages.

* cited by examiner

SUPPORT FOR IMS VIRTUAL CLIENTS IN MULTI-OPERATOR ENVIRONMENT

RELATED APPLICATIONS

This application claims priority to U.S. Application No. 62/672,049, filed 15 May 2018, disclosure of which is incorporated in its entirety by reference herein.

TECHNICAL FIELD

The present disclosure relates generally to techniques for supporting Internet Protocol (IP) Multimedia Subsystem (IMS) virtual clients in a multi-operator environment.

BACKGROUND

Fourth Generation (4G) networks are now widely deployed and the Third Generation Partnership Project (3GPP) is currently developing the standards for Fifth Generation (5G) systems. When 5G networks become available, network operators are expected to deploy a mixture of 5G core (5GC) networks and Evolved Packet Core (EPC) networks.

Currently 3GPP is finalizing specifications for the 5GC network in several 3GPP Technical specifications. The 5GC network, which may be based on an evolution of the current EPC or based on a "clean slate" approach, is defined over the Network Function Virtualization (NFV) and Software Defined Networking (SDN). The 5GC must support various access networks including but not limited to:

- The new radio access network (New RAN), also known as the 5G Universal Terrestrial Radio Access Network (G-UTRAN), NextGen (NG) RAN, or 5G/NG RAN, that supports the Evolved Long Term Evolution (eLTE) Evolved NodeBs (eNBs), which are commonly referred to as NG eNBs; and/or
- The new radio (NR) access network technology, also known as 5G Universal Terrestrial Radio Access (G-UTRA), base stations (BSs), which are commonly referred to as 5G NodeB (5G NB) or gNB; and/or
- Other non-3GPP access networks, such as a Wireless Local Area Network, WLAN.

It is expected that most user equipment (UE) that support 5G will also support 4G or other radio access technologies. This is a likely scenario during a transition period to a full 5G deployment, or even on a more long-term basis. It is possible that not all operators will migrate their network to 5G. Currently, a UE supporting 4G is connected to an EPC network via an LTE eNB, where EPC is specified in 3GPP TS 23.401. A 4G/5G UE supports at least 4G and 5G radio access technologies, and may access:

- an EPC, via 4G LTE eNB or 5G gNB, or
- a 5GC, via a LTE Ng eNB or via 5G gNB.

Requirements to support IMS services over 5G are also specified in 3GPP. According to these requirements, IMS be accessed via EPC or 5GC in a communication system. The Proxy Call Session Control Function (P-CSCF) and other IMS functions in the IMS interfaces with:

- the EPC/5GC over an Rx/N5 interface to a policy server, referred to by 3GPP as a server hosting a Policy and Charging Rules (PCRF) or Policy Control Function (PCF), and
- the EPC/5GC over the SGi/N6 interface to a packet data gateway (PGVV) for sending and receiving IMS signaling and IMS media packets to and from the UE.

SUMMARY

The present disclosure presents techniques for dynamic management of IMS connections between enterprise virtual IMS clients and multiple available IMS service providers (also referred to herein as "IMS operators" or simply "operators"). Unlike existing techniques, the example embodiments described in the present disclosure can dynamically handle transitions between these different IMS service providers for client-originating and client-terminating IMS sessions.

In one embodiment, the present embodiments provide a method of managing Internet Protocol (IP) Multimedia Subsystem (IMS) connections between virtual IMS clients and a plurality of available IMS service providers. The method is implemented by an IMS node in a first IMS domain and comprises registering a wildcard IMS Public User Identity (IMPU) in the first IMS domain responsive to receiving a registration request message from an enterprise node, receiving an IMPU assigned to the virtual IMS client, and the virtual IMS domain name, determining that the virtual IMS domain name maps to a corresponding IMS domain name for the first IMS domain, and establishing an IMS session between the virtual IMS client and an IMS service provider using the virtual IMS domain name and ignoring the IMS domain name for the first IMS domain.

In one embodiment, registering the wildcard IMPU in the first IMS domain comprises storing the wildcard IMPU in a registration record associated with the virtual IMS client.

In one embodiment, the virtual IMS domain name is received from the virtual IMS client in a contact header of a message.

In one embodiment, the virtual IMS domain name is received in a header of the session initiation request message.

In one embodiment, the method further comprises receiving a session termination request message for the virtual IMS client from an application server.

In such embodiments, the session termination request message comprises the IMPU assigned to the virtual IMS client, and the virtual IMS domain name.

Additionally, in some embodiments, the method further comprises determining routing information stored in the registration record associated with the virtual IMS client based on the virtual IMS domain name, identifying a destination node to which the session termination message is to be routed based on the routing information, and routing the session request termination message to the destination node.

In one embodiment, the session termination request message comprises the IMPU assigned to the virtual IMS client, and the first IMS domain name.

In such embodiments, the method further comprises locating the virtual IMS domain name in the registration record associated with the virtual client based on the first IMS domain name received with the session termination request message, identifying a destination node to which the session termination message is to be routed based on routing information stored in the registration record, and routing the session request termination message to the destination node.

Additionally, in one embodiment, the destination node is another node in the first IMS domain, while in another embodiment, the destination node is the enterprise node.

The embodiments also prove, according to the present disclosure, an Internet Protocol (IP) Multimedia Subsystem (IMS) node, in a first IMS domain, that is configured to manage connections between virtual IMS clients and a plurality of available IMS service providers. According to these embodiments, the IMS node comprises communications circuitry configured to communicate with one or more devices via one or more communications networks, and processing circuitry operatively connected to the communications circuitry. The processing circuitry is configured to register a wildcard IMS Public User Identity (IMPU) in the first IMS domain responsive to receiving a registration request message from an enterprise node, receive an IMPU assigned to the virtual IMS client, and the virtual IMS domain name, determine that the virtual IMS domain name maps to a corresponding IMS domain name for the first IMS domain, and establish an IMS session between the virtual IMS client and an IMS service provider using the virtual IMS domain name and ignoring the IMS domain name for the first IMS domain.

In one embodiment, the processing circuitry is further configured to store the wildcard IMPU in a registration record associated with the virtual IMS client.

In one embodiment, the processing circuitry is further configured to receive the virtual IMS domain name from the virtual IMS client in a contact header of a message.

In one embodiment, the virtual IMS domain name is received in a header of the session initiation request message.

In one embodiment, the processing circuitry is further configured to receive, from an application server, a session termination request message for the virtual IMS client.

In one embodiment, the session termination request message comprises the IMPU assigned to the virtual IMS client, and the virtual IMS domain name.

In these embodiments, the processing circuitry is further configured to determine routing information stored in the registration record associated with the virtual IMS client based on the virtual IMS domain name, identify a destination node to which the session termination message is to be routed based on the routing information, and route the session request termination message to the destination node.

In one embodiment, the session termination request message comprises the IMPU assigned to the virtual IMS client, and the first IMS domain name.

In one embodiment, the processing circuitry is further configured to locate the virtual IMS domain name in the registration record associated with the virtual client based on the first IMS domain name received with the session termination request message, identify a destination node to which the session termination message is to be routed based on routing information stored in the registration record, and route the session request termination message to the destination node.

In one embodiment, the IMS node comprises a Proxy-Call Session Control Function (P-CSCF), while in another embodiment, the IMS node comprises a Serving-Call Session Control Function (S-CSCF).

In addition, the present disclosure also provides a system for managing connections between one or more virtual Internet Protocol (IP) Multimedia Subsystem (IMS) clients and a plurality of available IMS service providers. In at least one embodiment, the system comprises an enterprise node, and an IMS node in a first IMS domain. The enterprise node is communicatively connected to the IMS node in the first IMS domain, and is configured to send a registration request message to the first IMS domain to register a wildcard IMPU. The IMS node in the first IMS domain is configured to register the wildcard IMS Public User Identity (IMPU) in the first IMS domain responsive to receiving the registration request message from the enterprise node, receive an IMPU assigned to the virtual IMS client, and the virtual IMS domain name, determine that the virtual IMS domain name maps to a corresponding IMS domain name for the first IMS domain, and establish an IMS session between the virtual IMS client and an IMS service provider using the virtual IMS domain name and ignoring the IMS domain name for the first IMS domain.

In one embodiment, the IMS node comprises a Proxy-Call Session Control Function (P-CSCF). In another embodiment, the IMS node comprises a Serving-Call Session Control Function (S-CSCF).

In one embodiment, the system further comprises a dynamic address management application server (AS) communicatively connected to the enterprise node and the IMS node in the first IMS domain. In these embodiments, the AS is configured to receive a virtual Uniform Resource Indicator (URI) from the enterprise node, wherein the virtual URI comprises the IMPU assigned to the virtual IMS client and the virtual IMS domain name, bind the virtual URI received from the enterprise node with an explicit URI used for routing, wherein the explicit URI comprises an IMS domain name of the first IMS domain, store the binding in a memory circuit, and send the binding to the enterprise node.

Additionally, in one embodiment, the AS is further configured to convert the virtual IMS domain name to the IMS domain name of the first IMS domain, and convert the first IMS domain name to the virtual IMS domain name.

In one embodiment, the IMS node is further configured to receive, from the AS, a session termination request message for the virtual IMS client, wherein the session termination request message comprises the IMPU assigned to the virtual IMS client, and one of the virtual IMS domain name and the IMS domain name.

In one embodiment, if the session termination request message comprises the virtual IMS domain name, the IMS node is further configured to determine routing information stored in the registration record associated with the virtual IMS client based on the virtual IMS domain name, and route the session request termination message to a destination node based on routing information stored in the registration record.

In one embodiment, if the session termination request message comprises the IMS domain name, the IMS node is further configured to determine the virtual IMS domain name stored in the registration record associated with the virtual client based on the first IMS domain name, and route the session request termination message to a destination node based on routing information stored in the registration record.

In one embodiment, the destination node is another node in the first IMS domain. In another embodiment, the destination node is the enterprise node.

DETAILED DESCRIPTION OF EXAMPLE EMBODIMENTS

The present disclosure presents techniques for the dynamic management of IMS connections between enterprise virtual IMS clients and multiple available IMS service providers (also referred to herein as "IMS operators" or simply "operators"). Unlike existing techniques, the example embodiments described in the present disclosure can dynamically handle transitions between these different IMS service providers for client-originating and client-terminating IMS sessions. Specifically, the present disclosure describes novel techniques for offering new subscription types that can be utilized for serving IMS clients in enterprise communication systems. In some examples, an improved type of subscription enables compatible IMS service providers to comprehend an enterprise-generated domain name in SIP sessions, where the enterprise-generated domain name is different than the true (i.e. externally registered) domain name corresponding to the IMS service provider. This ensures that an enterprise IMS node/client can obtain an IMS Public User Identity (IMPU/IMP) and use the domain name for a particular IMS service provider that was generated or otherwise obtained by the enterprise to refer to the IMS service provider used for handling the session for the IMPU. Thus, the virtual IMS clients utilize these IMPUs in conjunction with a domain name owned and used by the enterprise for all external communication with other clients regardless of the IMS provider.

Figure 1:
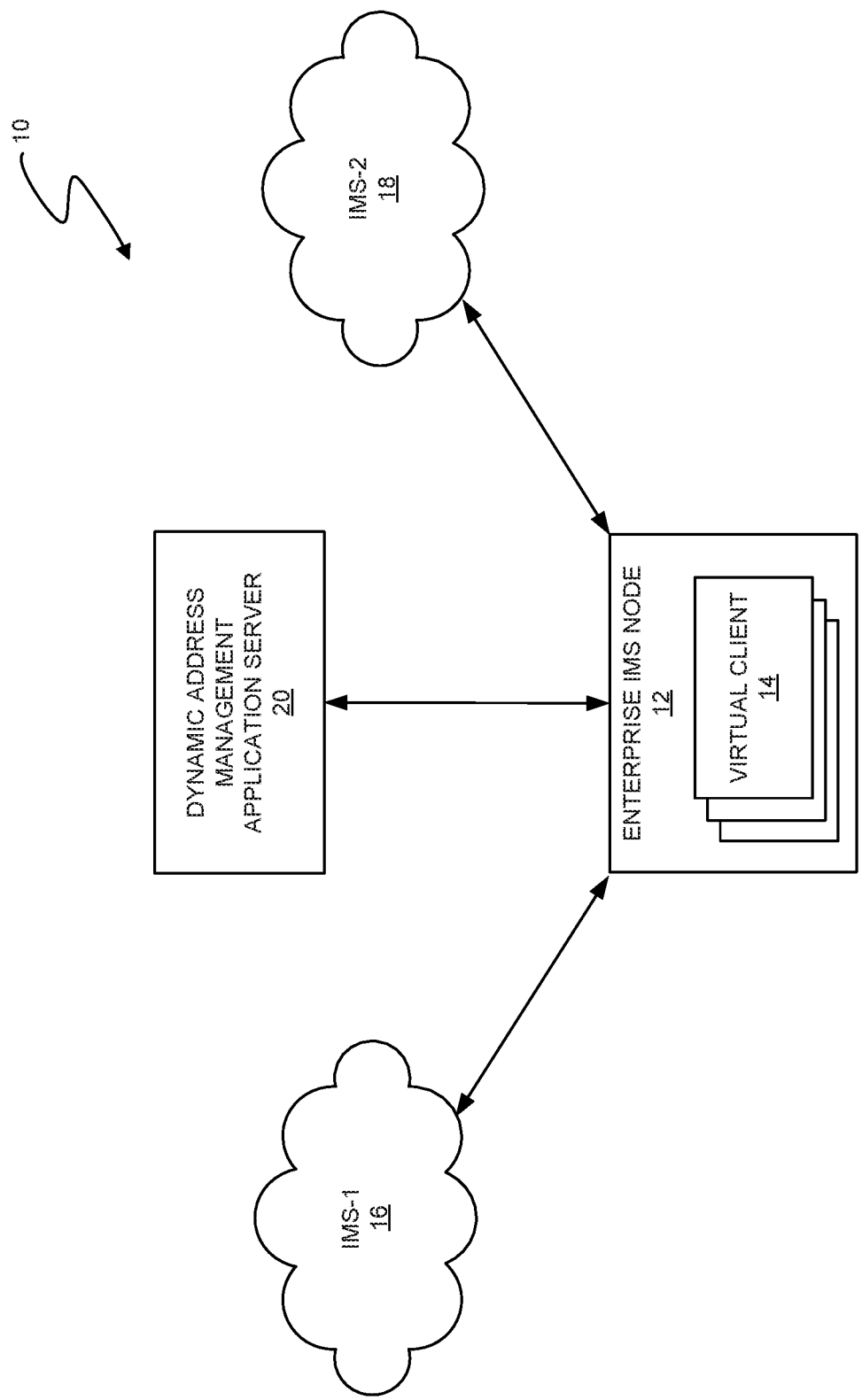
FIG. 1 is a functional block diagram illustrating a communications system configured according to an embodiment of the present disclosure.

Referring to FIG. 1, the communications environment 10 includes an enterprise computer system 10 owning multiple IMS subscriptions for two or more operator networks, each of which is configured to provide access to one or more IMS service providers IMS-1 16 and IMS-2 18. The enterprise communications system includes one or more enterprise nodes (ENs) 12 (e.g., Session Initiation Protocol (SIP) nodes). In this embodiment, each EN 12 serves as a Private Branch Exchange (PBX) and is configured to manage multiple virtual IMS clients 14. In some cases, such an enterprise system 10 could increase flexibility, throughput, and overall communication speed by having the functionality to select a particular IMS service provider 16, 18 of the available IMS service providers to be utilized by a given virtual IMS client for both client-initiated and client-terminated sessions. According to the present embodiments, this selection can change on a per-session basis.

To support this functionality, in some embodiments, the enterprise operating the enterprise system 10 can obtain, for each EN 12 (or PBX), a wild-carded IMS Public User Identity (IMPU or IMP) subscription for each of the one or more IMS service providers 16, 18. Any IMPU in that wild card range can be utilized for a given virtual IMS client 14 to start an IMS session with any IMS service provider 16 and/or 18, according to a policy implemented by the enterprise. Any IMS terminating session to any IMPU in the wild carded range can also use any IMS service provider 16 and/or 18 for handling that particular session.

In addition, the IMPUs in that wild carded range are owned and used by the enterprise node for external communication, and can be associated with a virtual IMS service provider rather with any explicit IMS service provider. Accordingly, in an aspect of the example embodiments described herein, the network can be configured to manage the proper routing for a particular IMS session depending on the IMS service provider 16, 18 used for that specific IMS session, which is related to an IMPU in the wild card range.

Further, system 10 can include a dynamic address management application server (AS) 20 (also referred to herein as simply application server 20 or AS 20) that is configured to assist with proper routing of IMS traffic. According to the techniques introduced herein, such assistance includes, but is not limited to domain mapping, domain and node/client identification, etc.

The AS 20, acting as a SIP proxy, may be configured to handle the dynamic aspects related to terminating sessions for handling any IMPU, and in addition, to determine the IMS service provider to be used for the session. The AS 20 also can be configured to perform any domain name conversion on the SIP signalling, which will be described further below. In an aspect, the AS 20 is managed by the enterprise.

Additionally, according to the present embodiments, EN 12 allocates a given IMS service provider 16, 18 to service any originating session. Further, similarly to what AS 20 does for terminating sessions, EN 12 can be configured to perform domain name conversion for terminating sessions (i.e. convert an enterprise-generated domain name to an actual or externally registered domain name, and vice versa). However, this conversion functionality is not required for all embodiments of EN 12. In some embodiments, for example, no domain name conversion is performed for originating sessions.

For terminating sessions, the present disclosure provides embodiments for supporting two options. In a first option, no domain name conversion is performed, while in the second option, domain name conversion is performed as described above.

Further, in at least one aspect, both the AS 20, and the EN 12 can maintain a binding between the IMPU of a given virtual IMS client 14 and the IMS provider 16 and/or 18 used for the duration of the session.

Additionally, although not a limiting aspect of the present embodiments, for purposes of this disclosure, one can initially assume that the techniques described herein are used in fixed access architecture and not in an architecture utilizing or requiring mobile access to communicate IMS data between virtual (or actual) IMS clients and IMS services.

Figure 2:
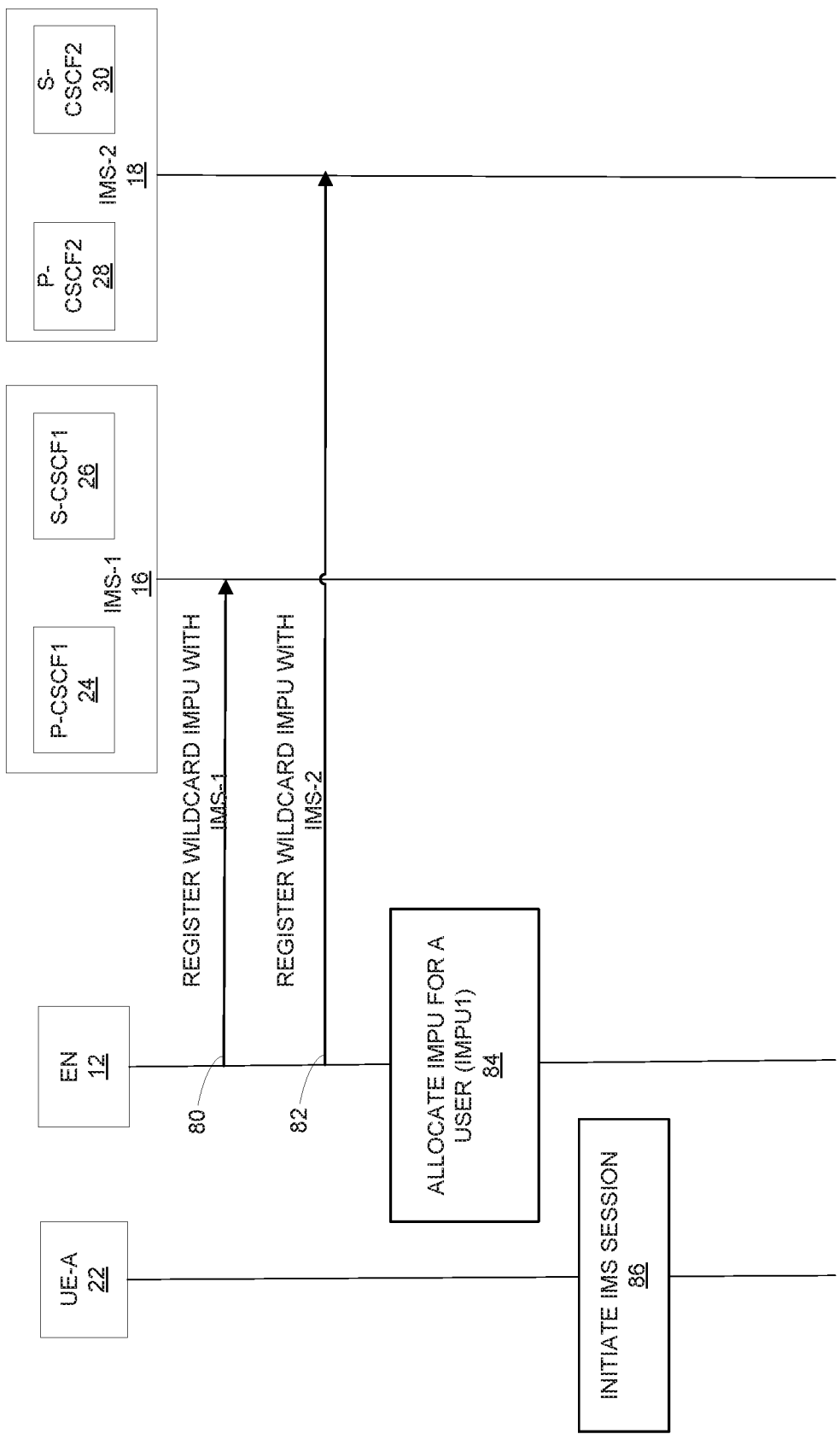
FIG. 2 is a call flow diagram illustrating a method of wildcard registration according to an embodiment of the present disclosure.

The following description explains the features presented in example call flows of FIGS. 2-5C, which describe example aspects of the techniques introduced above. In particular, FIG. 2 is a call flow diagram illustrating a method of wildcard registration according to an embodiment of the present disclosure. More particularly, FIG. 2 illustrates a first example call flow wherein EN 12 registers a wildcarded IMPU corresponding with two example IMS service providers, IMS-1 16 and IMS-2 18. In an key aspect of the techniques presented herein, each IMPU is associated with a virtual IMS domain that is chosen by the enterprise. As stated above, this is the domain name that will be used to reach a specific user (e.g. each specific virtual IMS client 14) regardless of the IMS service provider 16, 18 used for that IMPU, and that can change from session to session.

As seen in FIG. 2, EN 12 first registers the wild carded IMPU with a first IMS service provider (i.e., IMS-1 16) using regular IMS registration (line 80). The EN 12 registers the wildcarded IMPU using the IMS1.com domain name. However, the P-CSCF must also be aware of the virtual IMS domain name (e.g., virtualdomain.com). This can be achieved in numerous ways.

In one embodiment, a particular user device 22 (user equipment or "UE") can include the virtual IMS domain name as an additional parameter in the contact header to indicate to P-CSCF1 24 that this is a special subscription. This indication, together with a SIP 200 OK response, indicates to P-CSCF1 24 that this is a special subscription, and as such, P-CSCF1 24 should ignore the virtual IMS domain name (e.g., virtualdomain.com) when received in SIP initiation requests.

In another embodiment, the UE 22 does not include any such additional parameter. Rather, the SIP 200 OK sent in response to a received SIP Registration Request includes the virtual IMS domain name (e.g., virtualdomain.com) in a new header. The indicated "virtualdomain.com" is maintained by P-CSCF 24, and is associated with an IMS registration record it maintains for the UE 22. Regardless of the embodiment, however, the information is stored in the registration record of UE 22 in P-CSCF1 24.

According to the present disclosure, an S-CSCF can be configured to perform the same or similar functions as those performed by the P-CSCF. Particularly, an S-CSCF can also be configured to determine that a subscription is special based on a received subscriber profile, as well as store a virtual IMS domain name, and associate that virtual IMS domain name with a UE profile stored in the S-CSCF. Thus, the present embodiments also configure the S-CSCF to also ignore a virtual IMS domain name (e.g., virtualdomain.com) when that name is present in session initiation requests.

To support this capability, EN 12 also registers the wild carded IMPU with a second IMS service provider IMS-2 18 using regular IMS registration (line 82). As above, EN 12 registers the wildcarded IMPU using the actual domain name of IMS-2 18 (e.g., IMS2.com). Further, the P-CSCF2 28 and S-CSCF2 30 of IMS-2 18 must also be aware of the virtual IMS domain name (e.g., virtualdomain.com). Making S-CSCF2 30 aware of the virtual domain name can be accomplished in a manner similarly to that described above. Thus, upon receiving a SIP Register request in the IMS2.com domain, S-CSCF2 30 is configured to perform the same roles and functions as S-CSCF1 26 receiving that request in the IMS1.com domain.

It should be noted that conventional P-CSCFs and S-CSCFs are not configured to implement the functionality described above. However, the P-CSCFs and S-CSCFs of the present embodiments are configured to perform these functions. Thus, P-CSCFs and S-CSCFs configured according to the embodiments described herein provide enhancements and benefits that conventionally configured P-CSCFs and S-CSCFs are not able to provide.

Once the wildcard IMPU is registered with IMS-1 16 and IMS-2 18, EN 12 can allocate an IMPU for a user (e.g. IMPU1 for user UE 12) (box 84). The IMPU for this user is utilized to originate and receive IMS session data regardless of the actual IMS domain (e.g., IMS-1 16 and/or IMS-2 18) utilized for the session. In other words, a particular user (i.e., a virtual IMS client 14, for instance) can always have a "virtual IMPU" allocated to it. For example, in this embodiment, a virtual IMS client 14 may have "IMPU1©virtualdomain.com" allocated to it for originating and terminating sessions. Once the wildcard IMPU is registered with IMS-1 16 and IMS-2 18, UE 22 can request that EN 12 initiate a session (box 86).

Figure 3A:
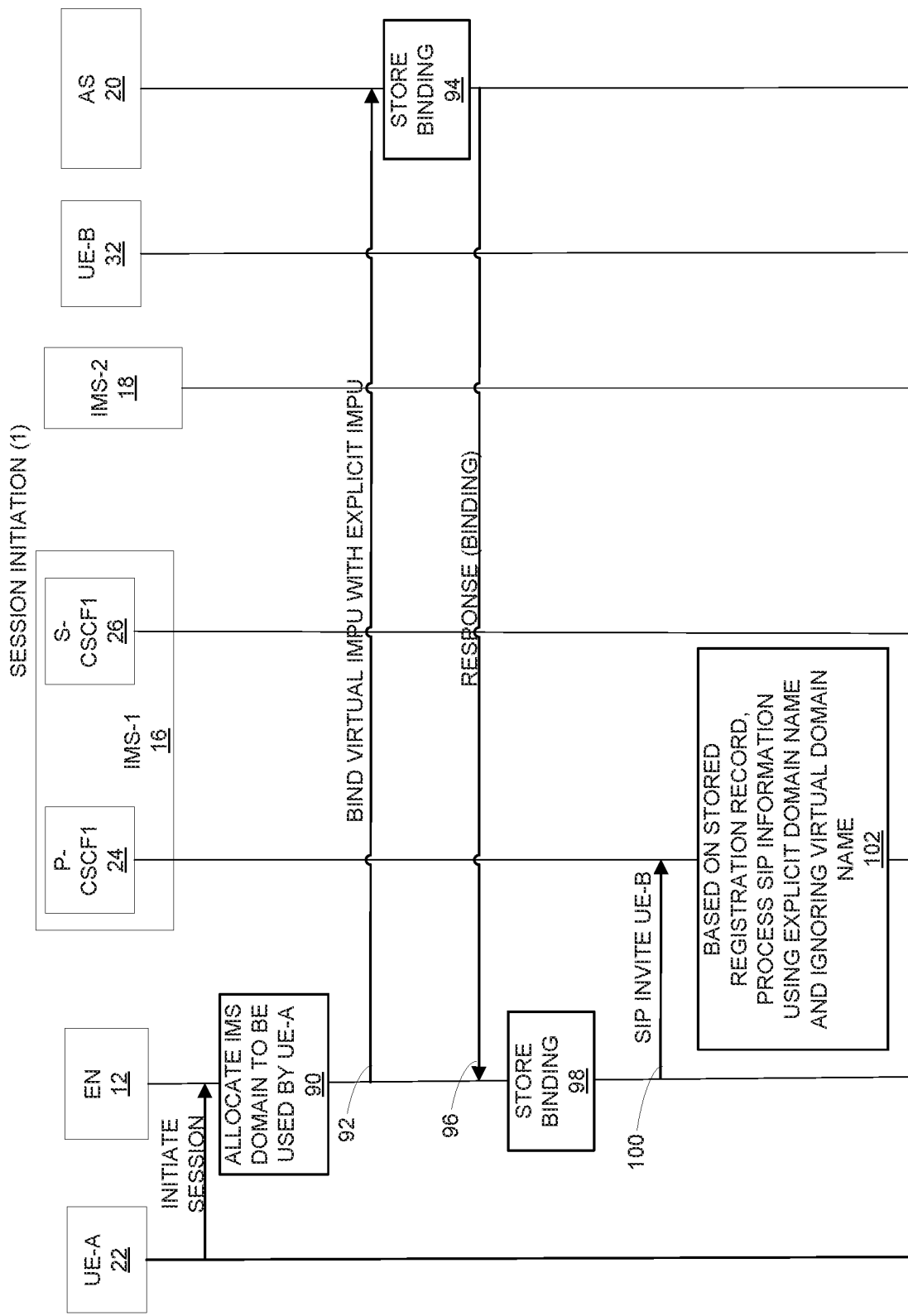
FIGS. 3A-3B are call flow diagrams illustrating a method for initiating an IMS session according to an embodiment of the present disclosure.
Figure 3B:
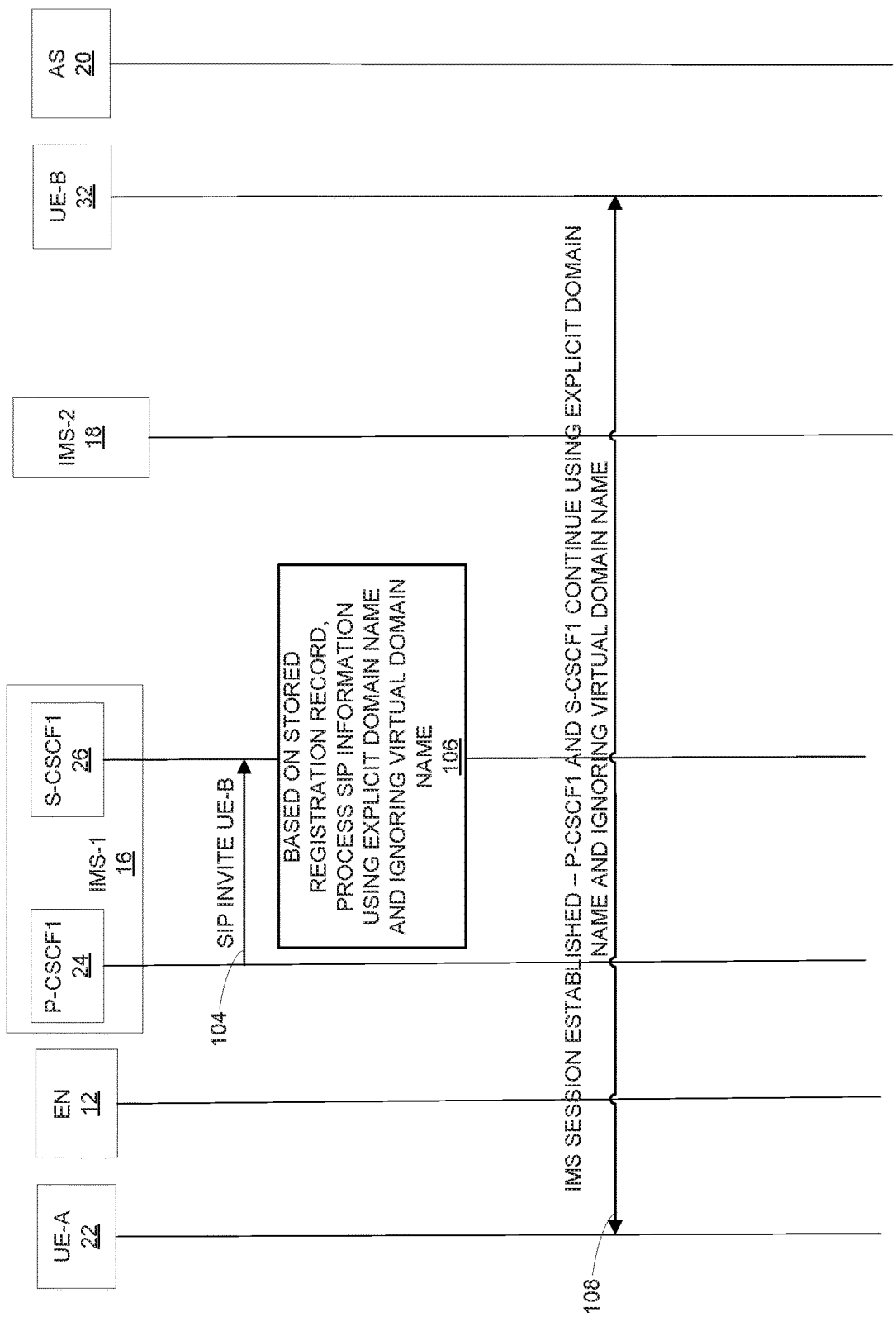

FIGS. 3A-3B are call flow diagrams illustrating a method for initiating an IMS session according to an embodiment of the present disclosure. In particular, FIGS. 3A-3B illustrate a case of an originating IMS session in which the functionality of the AS 20 is utilized. As seen in FIG. 3A, EN 12 is configured to allocate and assign an IMS service provider (e.g., IMS-1 16) to the IMPU used in the originating session (box 90). According to the present disclosure, this allocation and assignment is dynamic and can change on a per-session basis. Once assigned, EN 12 sends a message to AS 20 to bind the virtual IMPU (e.g., IMPU1©virtualdomain.com) bind to the actual or explicit domain name for IMS-1 16 (e.g., IMPU1©IMS-1domain.com) that is used for routing (line 92). The AS 20, upon receipt of the message, creates the binding and stores the binding in a storage device, such as an internal or external database, for example (box 94). The AS 20 then sends the same binding information to EN 12 in a return message (line 96).

It should be noted that the response is sent to the EN 12 to indicate a positive acknowledgement of the binding. However, the actual binding information need not be included in the response message. In some embodiments, the EN 12 will already have the information associated with the binding and does not need to receive that information from AS 20. Therefore, in some embodiments of the present disclosure, the AS 20 sends the acknowledgment without the binding information.

The EN 12, upon receipt of the response message from AS 20, stores the binding information it received with the response message as serving/owning PBX (box 98). In cases where the binding information is not sent by AS 20, the EN 12 will simply store the binding information it already has responsive to receiving the response message from AS 20. The EN 12 then sends a SIP Invite message to IMS-1 16 to initiate a session with a destination user UE-B 32 (line 100). Upon receipt of the SIP Invite, IMS-1 16, and more specifically, P-CSCF 24, locates the registration record for UE-A 22. Based on the information stored in this record, P-CSCF 24 processes the SIP request using the explicit domain name of IMS-1 16 and ignores the virtual IMS domain name (box 102).

Turning to FIG. 3B, the P-CSCF 24 forwards the SIP Invite message to the S-CSCF 26 in IMS-1 16 (line 104). Responsive to receiving the SIP INVITE message, S-CSCF 26 performs the same functions as the P-CSCF 24. That is, the S-CSCF 26 locates the registration record for UE-A 22, and based on the information stored in that record, processes SIP requests using the explicit domain name of IMS-1 16 and ignoring the virtual IMS domain name (box 106). Thereafter, the requested IMS session is established between UE-A 22 and UE-B 32, with the P-CSCF 24 and the S-CSCF 26 using the explicit IMS domain name for IMS-1 16 (in this example, "IMPU1@IMS-1domain.com") and ignoring the virtual IMS domain name (in this example, "IMPU1@virtualdomainname.com") (line 108).

For originating sessions, a "from" field can include the virtual IMS domain name in the SIP universal resource indicator (URI) of the originating IMPU (IMPU@virtualdomain.com, the same for the P-Asserted-ID). This information can be ignored by all IMS nodes processing the session initiation request in the originating IMS service provider (e.g., IMS-1 16). This is based on the fact that the IMS subscription type associated with this wild carded IMPU enables the S-CSCF and P-CSCF to ignore the domain name associated with the originating IMPU and process the session as if their own domain name is in these SIP headers. As previously described, during IMS registration of the wildcarded IMPU, and after verifying whether a given IMPU is valid based on information that is stored in their own records, an HSS can include some special indicator associated with such special subscriptions to enable the S-CSCF and P-CSCF to ignore the domain name.

It should be noted that, in some embodiments, the binding information is not used for originating sessions. Moreover, in some examples, the binding information (i.e., the information that binds the explicit IMS domain name to the virtual IMS domain name) is used for terminating sessions, and in particular, for routing purposes. That is, in the event that there is a request to terminate a session to an IMPU while the user is engaged in the session, the binding information can be used to route that termination request to the correct IMS service provider (e.g., IMS-1 16) handling the called IMPU.

The call flows illustrated in FIGS. 3A-3B illustrate functions of the present disclosure as applied to the initiation of a session. In a feature of certain embodiments, when the IMS session is torn down, all bindings are removed in both the AS 20, and the EN 12. This enables a different IMS service provider (e.g., IMS-1 16, IMS-2 18) to be used the next time the same IMPU is used when initiating or receiving a session.

Figure 4A:
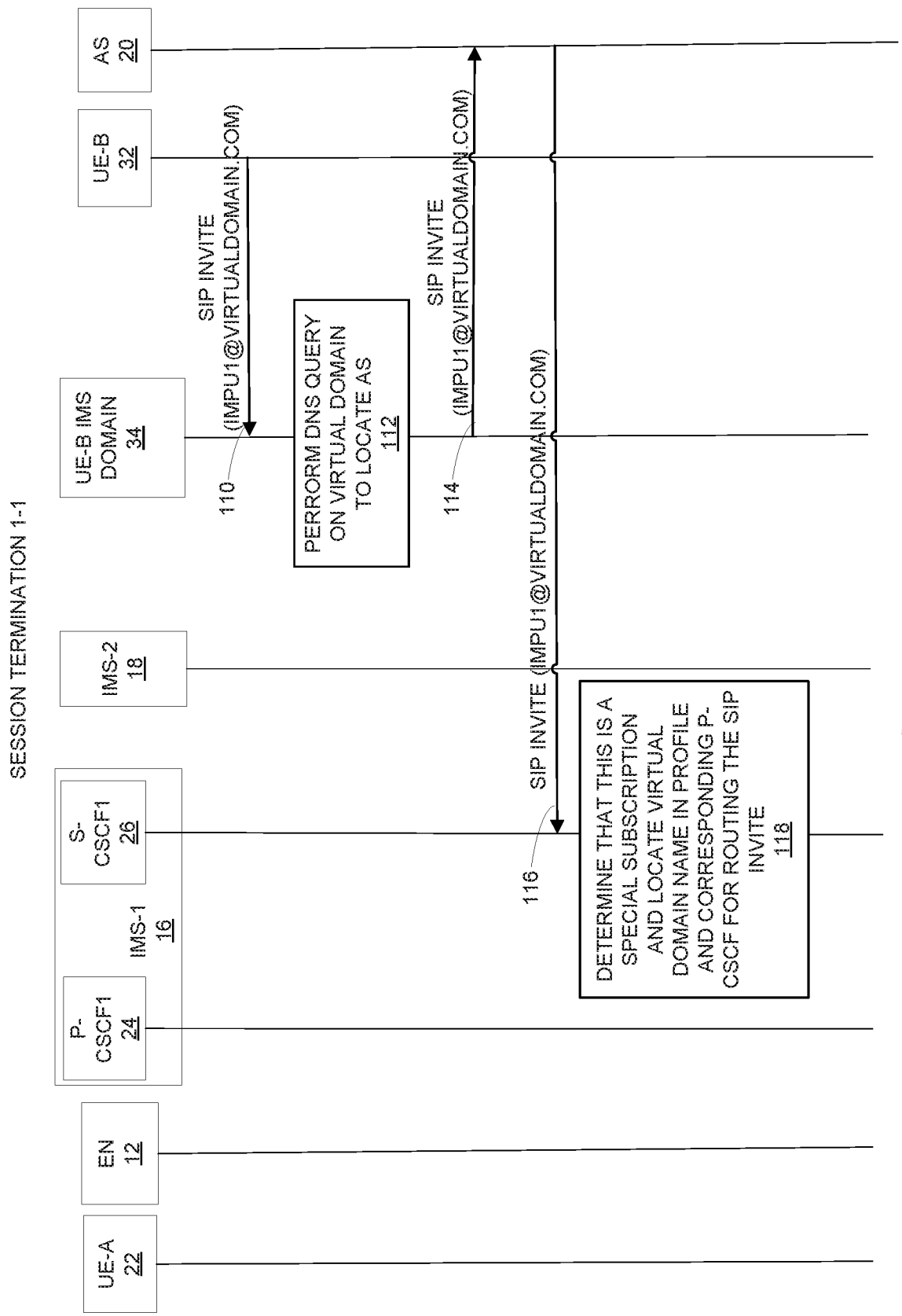
FIGS. 4A-4B are call flow diagrams illustrating a method for terminating an IMS session according to an embodiment of the present disclosure.
Figure 4B:
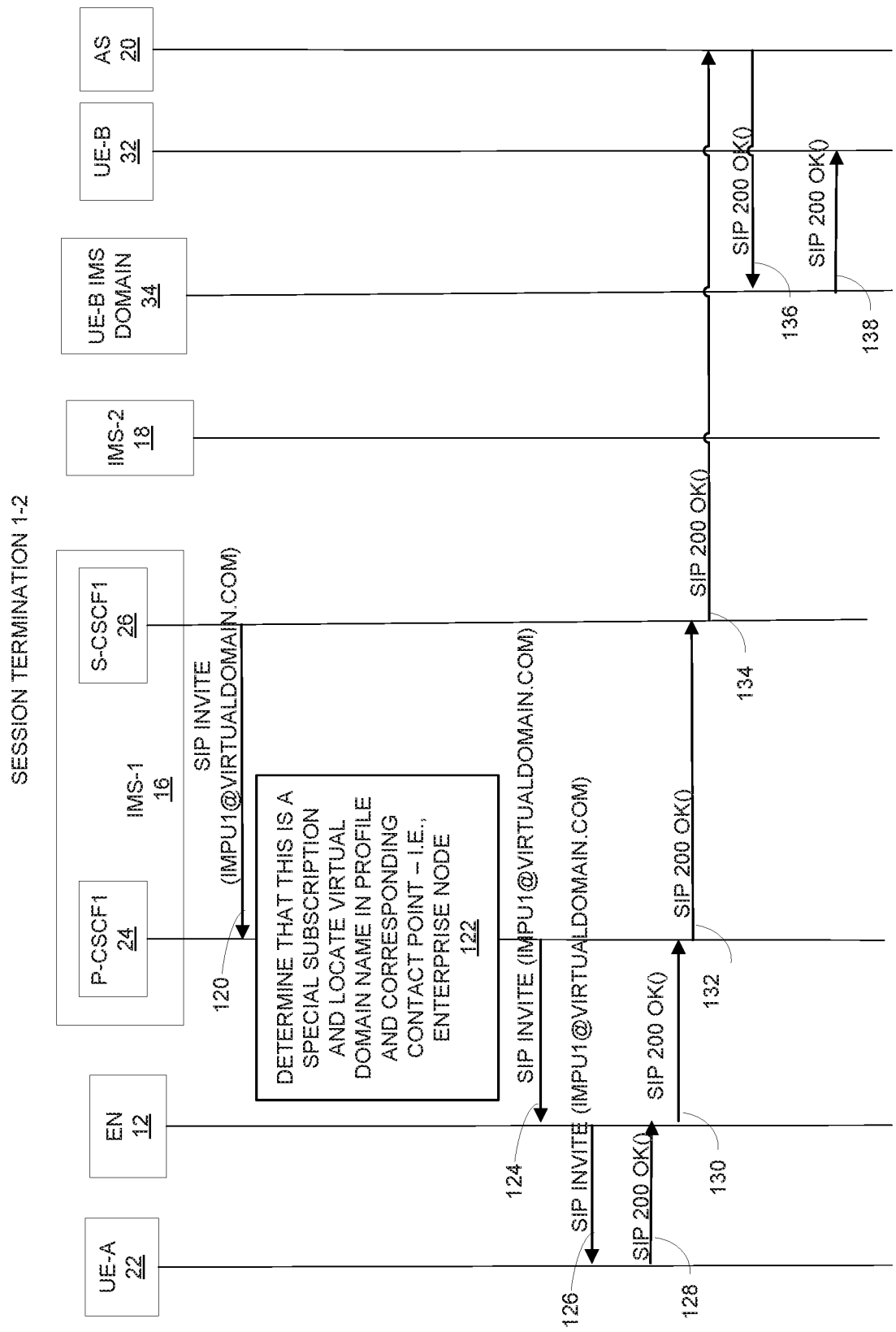

In more detail, FIGS. 4A-4B are call flow diagrams illustrating a method for terminating an IMS session according to an embodiment of the present disclosure. For terminating sessions to an IMPU, this embodiment illustrates that an IMPU allocated and assigned to, and used by, a remote user device will include the virtual IMS domain name. This is because the virtual IMS domain name is the public IMS domain name for the EN 12 clients (e.g. the virtual IMS clients 14) and is used for all communication regardless of the IMS provider. The resolution of this virtual IMS domain name at the remote device leads to the enterprise AS 20, which acts as a SIP back-to-back (B2B) proxy (e.g. a B2B user agent (B2BUA proxy).

As seen in 4A, UE-B 32 begins the session termination to UE-A 22 by sending a SIP INVITE message to its own IMS domain 34 (line 110). The SIP INVITE message include the virtual IMPU assigned to UE-A 22 (i.e., IMPU1@virtualdomain.com). The IMS domain 34 then performs a DNS query using the virtual IMS domain name in order to locate the appropriate AS 20 (box 112) and sends the SIP INVITE message to that AS 20 (line 114). Upon receipt, AS 20 attempts to locate the IMS domain associated with the target IMPU (because the user is engaged in a session and an entry exists). However, if the target IMPU entry is not found it simply allocates any IMS provider domain (i.e., IMS-1 16, IMS-2 18) for that session based on its internal policies. Regardless, AS 20 then routes the SIP INVITE to the S-CSCF of the selected IMS domain (line 116). The the S-CSCF in the target IMS domain (in this embodiment, S-CSCF 26 in IMS-1 16) then checks to determine if the terminating session is associated with an IMS special subscription (box 118). That is, S-CSCF1 26 attempts to locate the virtual domain name in a user profile for UE-A 22. If a record is located, S-CSCF1 26 identifies the appropriate P-CSCF to use for routing, ignores the virtual IMS domain name (after verifying that the virtual IMS domain name received with the SIP INVITE matches the virtual IMS domain name stored in its record), and routes the session normally to the terminating UE.

In particular, as seen in FIG. 4B, having identified the appropriate P-CSCF1 24 in IMS-1 16, the S-CSCF1 26, forwards the SIP INVITE to the P-CSCF 24 (line 120). Upon receipt, P-CSCF1 24 checks to determine if the terminating session is associated with an IMS special subscription, and if so, locates the virtual domain name in a user profile for UE-A 22. The P-CSCF1 24 also identifies, for routing purposes, the appropriate contact point (i.e., the appropriate EN 12) based on the information in the record (box 122). So identified, the P-CSCF1 24 sends the SIP INVITE, which includes the virtual IMS domain name, to the EN 12 (line 124). EN 12, in turn, forwards the SIP INVITE to the UE-A 22 (line 126). Thereafter, a SIP 200 OK message is sent by the various entities to finish terminating the session (lines 128-138).

According to the embodiment of FIGS. 4A-4B, the present disclosure does not perform any domain mapping between the virtual IMS domain name and the explicit or actual IMS domain name. Instead, the present disclosure configured the system entities to rely on the target IMS domain having the necessary information stored in the subscriber record both in P-CSCF and S-CSCF to validate the received domain and route the session correctly.

However, it should be understood that the present disclosure is not limited to the method shown in FIGS. 4A-4B. According to the present disclosure, there is an embodiment in which AS 20 performs a mapping and conversion between the virtual IMS domain and an explicit IMS domain. This embodiment is detailed in the call flow diagrams of FIGS. 5A-5C. In this embodiment, AS 20 replaces the virtual IMS domain name of the IMPU allocated and assigned by EN 12 with a selected IMS service provider name. The target IMS service provider then processes the call normally until it reaches EN 12. The EN 12 then replaces the selected IMS service domain name with the virtual domain name before handing the call to the user. In these embodiments, the EN 12 would perform the reverse functionality for outgoing SIP signalling by replacing the virtual IMS domain name with the selected service provider name. The AS 20 in the session would then replace the selected IMS provider name with the virtual IMS domain name. This ensures that both users in the session see only the virtual domain name.

Figure 5A:
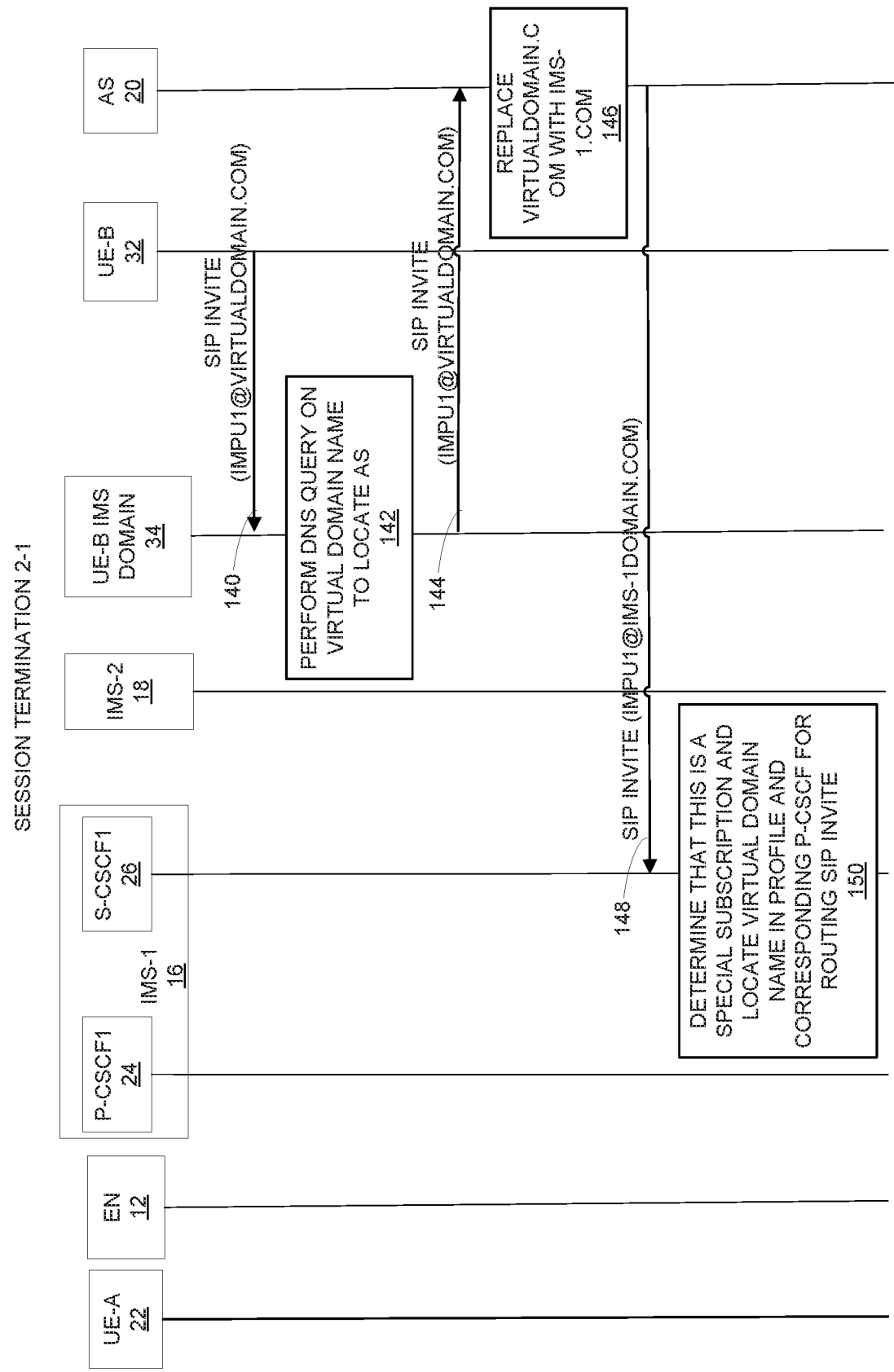
FIGS. 5A-5C are call flow diagrams illustrating another method for terminating an IMS session according to another embodiment of the present disclosure.

In more detail, the termination scenario according to this embodiment begins, in FIG. 5A, with UE-B 32 sending a SIP INVITE message to its own IMS domain 34 (line 140). The SIP INVITE message includes the virtual IMPU assigned to UE-A 22 (i.e., IMPU1@virtualdomain.com). The IMS domain 34 then performs a DNS query using the virtual IMS domain name in order to locate the appropriate AS 20 (box 142) and sends the SIP INVITE message to that AS 20 (line 144).

As in the previous embodiment, AS 20, upon receipt of the SIP INVITE message, attempts to locate the IMS domain associated with the target IMPU. However, in this embodiment, AS 20 is further configured to utilize the binding information to identify the explicit IMS domain name based on the virtual IMS domain name received with the SIP INVITE message. So identified, AS 20 replaces the virtual IMS domain name in the SIP INVITE message with the determined explicit IMS domain name (box 146), and sends the SIP INVITE message with the explicit IMS domain name to the S-CSCF 26 in IMS-1 16 (line 148). Upon receiving the SIP INVITE message, the S-CSCF 26 locates the virtual IMS domain name in the user profile record, identifies the corresponding P-CSCF to use for routing (box 150), and routes the session normally to the identified P-CSCF 24 (line 152). In this embodiment, the SIP INVITE message sent to the P-CSCF 24 includes the explicit IMS domain name (i.e., IMPU1@IMS-1domain.com).

Once P-CSCF 24 receives the SIP INVITE message from the S-CSCF 26, it locates the virtual IMS domain name in the user profile records stored at the P-CSCF 24 and identifies the corresponding contact point (i.e., the appropriate EN 12 to which to route the session to) (box 154). The P-CSCF 24 then routes the SIP INVITE message to the identified EN 12 (line 156), which then maps the explicit IMS domain name (i.e., IMPU1@IMS-1domain.com) received with the SIP INVITE message to a corresponding virtual IMS domain name (box 158). EN 12 then replaces the explicit IMS domain name in the received SIP INVITE message and sends the SIP message with the virtual IMS domain name to UE-A (line 160). Additionally, EN 12 then locates the virtual IMS domain name that corresponds to the explicit IMS domain name (box 162), and sends a SIP 200 OK message with the explicit IMS domain name to the P-CSCF 24 (line 164).

Figure 5B:
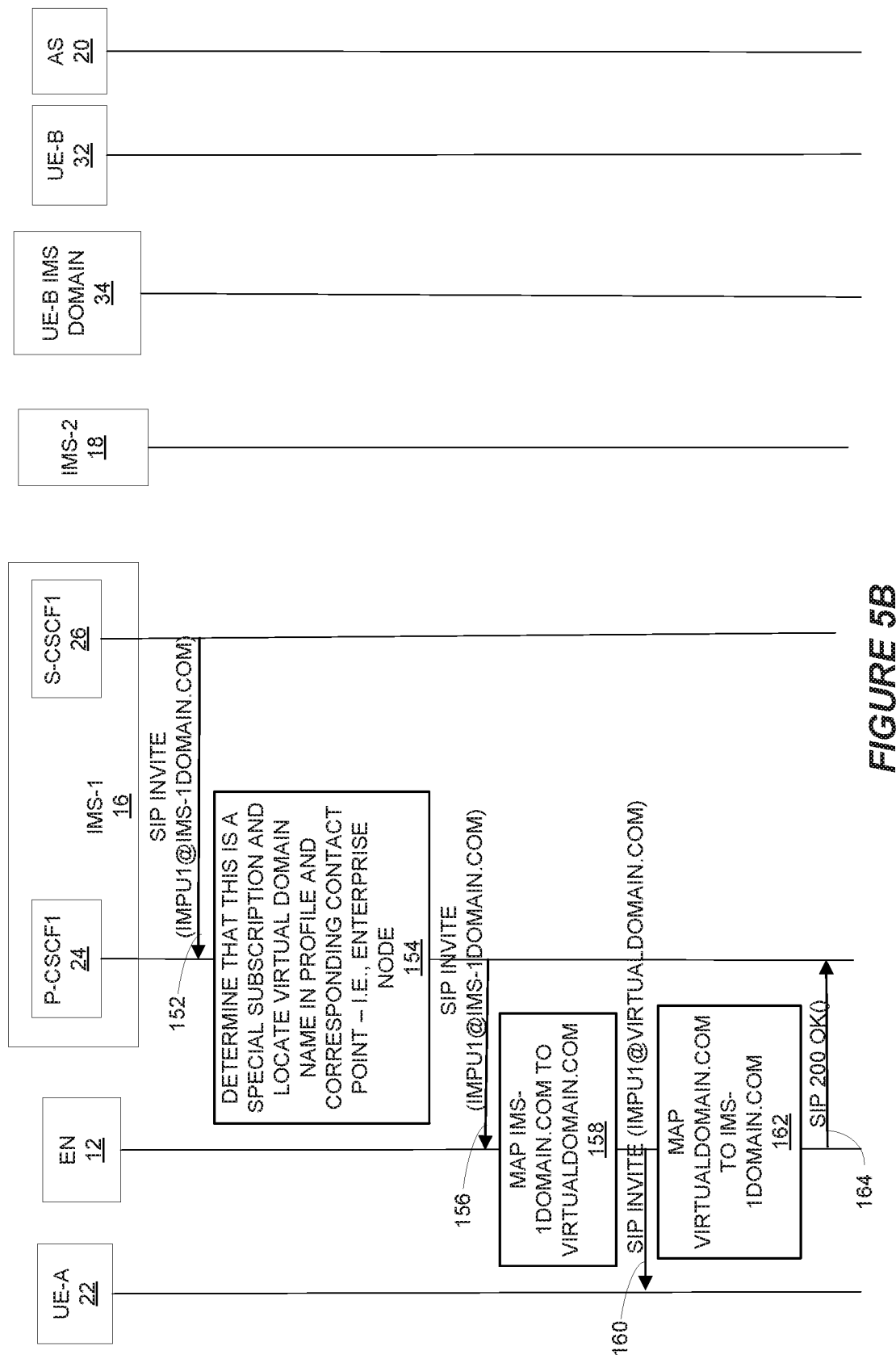
Figure 5C:
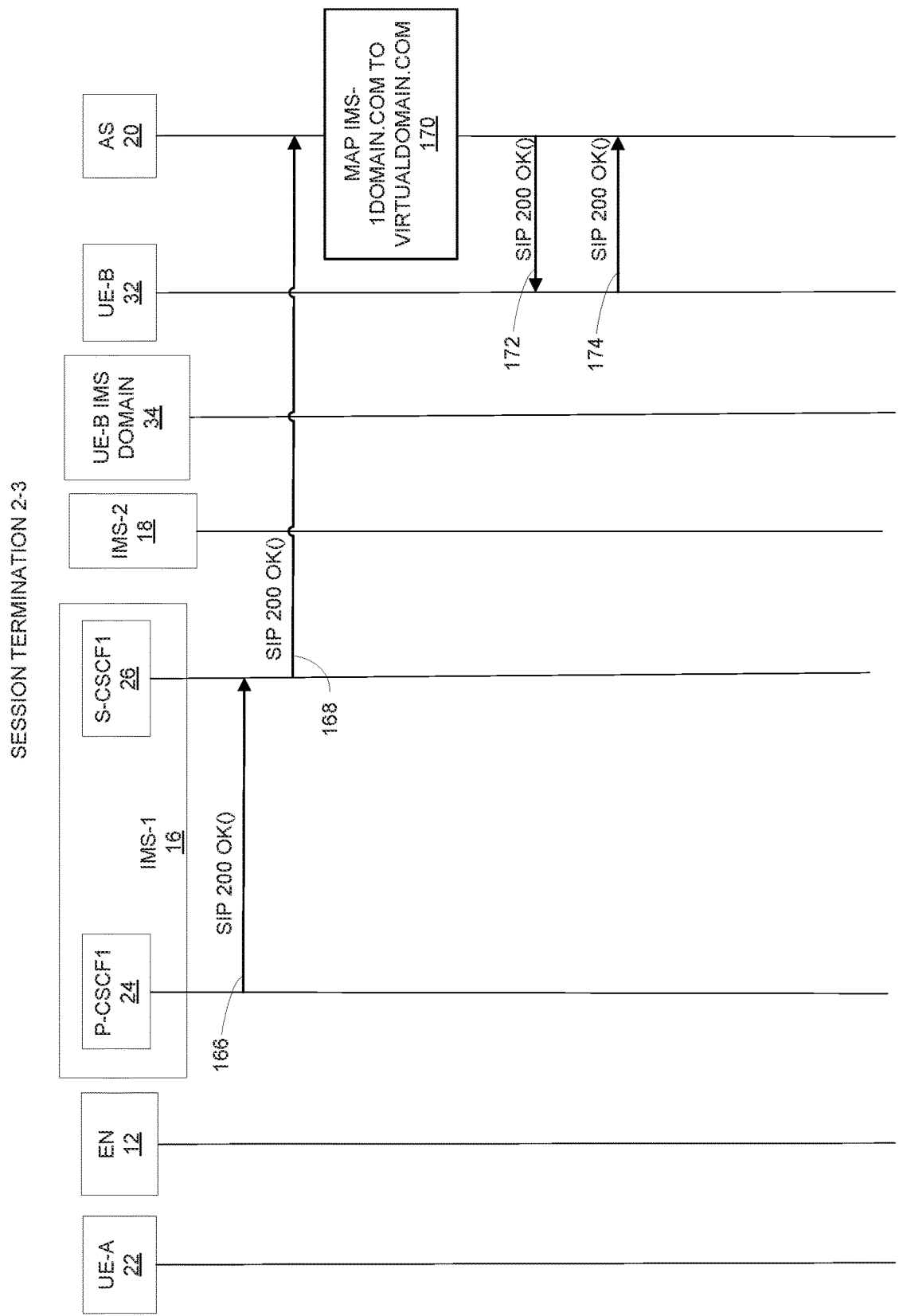

As seen in FIG. 5C, P-CSCF 24 then sends a SIP 200 OK message to the S-CSCF 26 (line 166), which in turn, sends a SIP 200 OK message to the AS 20 (line 168). Upon receipt, AS 20 maps the explicit IMS domain name to the virtual IMS domain name based on the stored binding information (box 170), and sends a SIP 200 OK message to UE-B 32 (line 172). UE-B 32 then sends a SIP 200 OK message back to AS 20 (line 174).

Thus, in the embodiment illustrated in FIGS. 5A-5C, the AS 20 selects an IMS provider for the session (e.g., IMS-1 16, IMS-2 18), and converts the virtual IMS domain name to the domain name of the selected IMS provider towards the UE. In the other direction (i.e., towards the remote end), it does the reverse conversion by changing the domain name of the IMS provider name to the virtual IMS domain name. Additionally, EN 12 performs the opposite functions. Particularly, EN 12 maps the IMPU associated with a specific IMS service provider name to the actual original virtual IMS domain IMPU SIP URI. EN 12 also performs the opposite functionality in the reverse directions towards the remote end, i.e EN 12 restores the IMS service provider in outgoing signaling.

Figure 6:
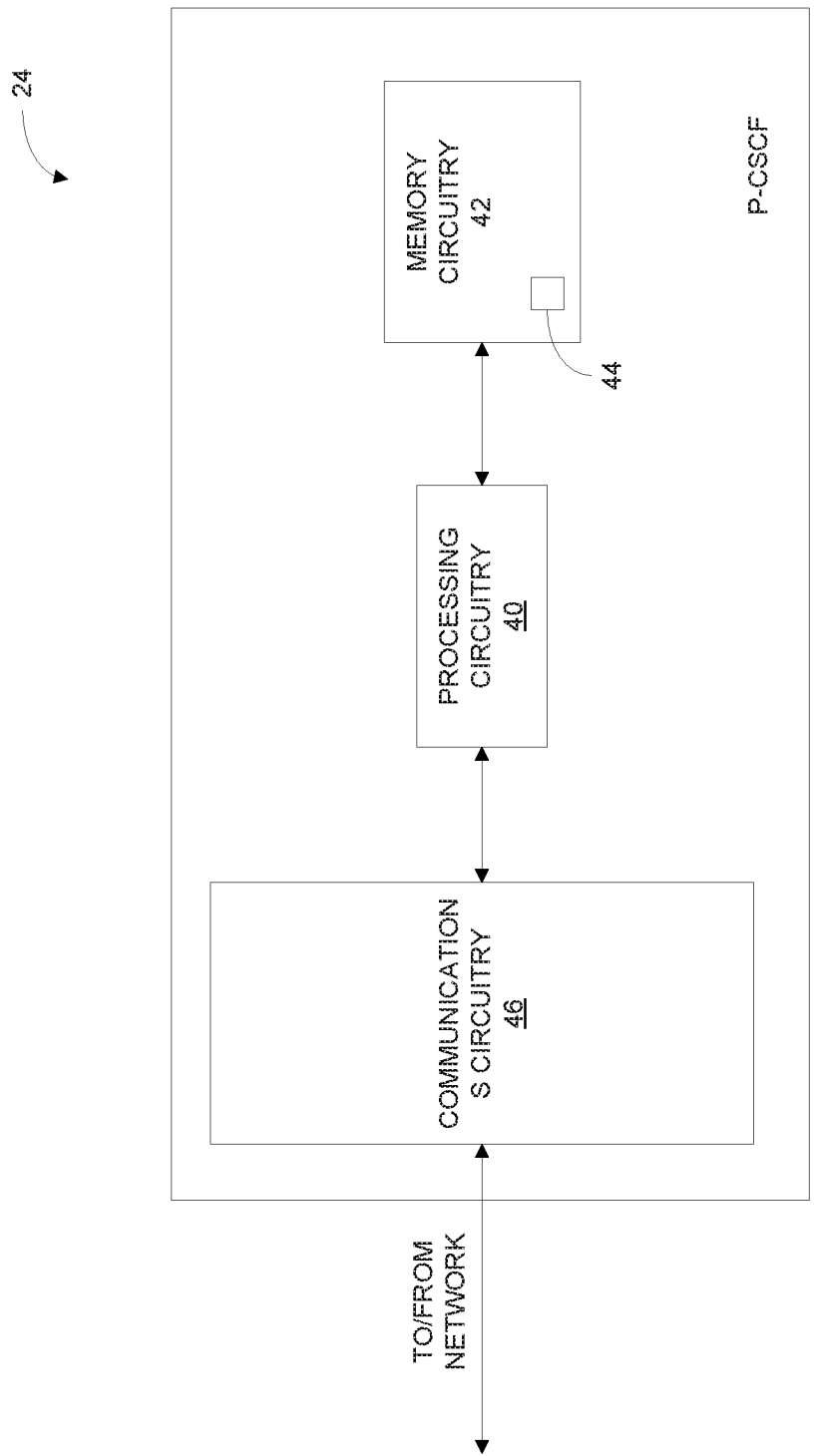
FIG. 6 is a schematic diagram illustrating an IMS node configured according to an embodiment of the present disclosure.

FIG. 6 is a schematic diagram illustrating an exemplary IMS node configured to operate according to embodiments of the present disclosure. In the embodiment of FIG. 6, the IMS node is illustrated and described as being a P-CSCF, such as P-CSCF 24. However, this is for illustrative purposes only. It should be noted that the IMS node described in connection with FIG. 6 can also be an S-CSCF, as both the P-CSCF and the S-CSCF perform the same functions according to the present embodiments.

As seen in FIG. 6, P-CSCF 24 comprises processing circuitry 40, memory circuitry 42, and communications circuitry 46. The processing circuitry 40 may comprise one or more microprocessors, microcontrollers, hardware circuits, firmware, or a combination thereof, and controls the operation of the P-CSCF 24 as herein described. Memory circuitry 42 stores program instructions and data needed by the processing circuitry 40. Permanent data and program instructions executed by the processing circuitry 40, such as control application 44, for example, may be stored in a non-volatile memory, such as a read only memory (ROM), electronically erasable programmable read only memory (EEPROM), flash memory, or other non-volatile memory device. A volatile memory, such as a random access memory (RAM), may be provided for storing temporary data. The memory circuitry 42 may comprise one or more discrete memory devices, or may be integrated with the processing circuitry 40. The communications interface circuitry 46 is configured to send messages to, and receive messages from, one or more other nodes in system 10, such as S-CSCF 26, EN 12, and AS 20, via SIP.

Figure 7:
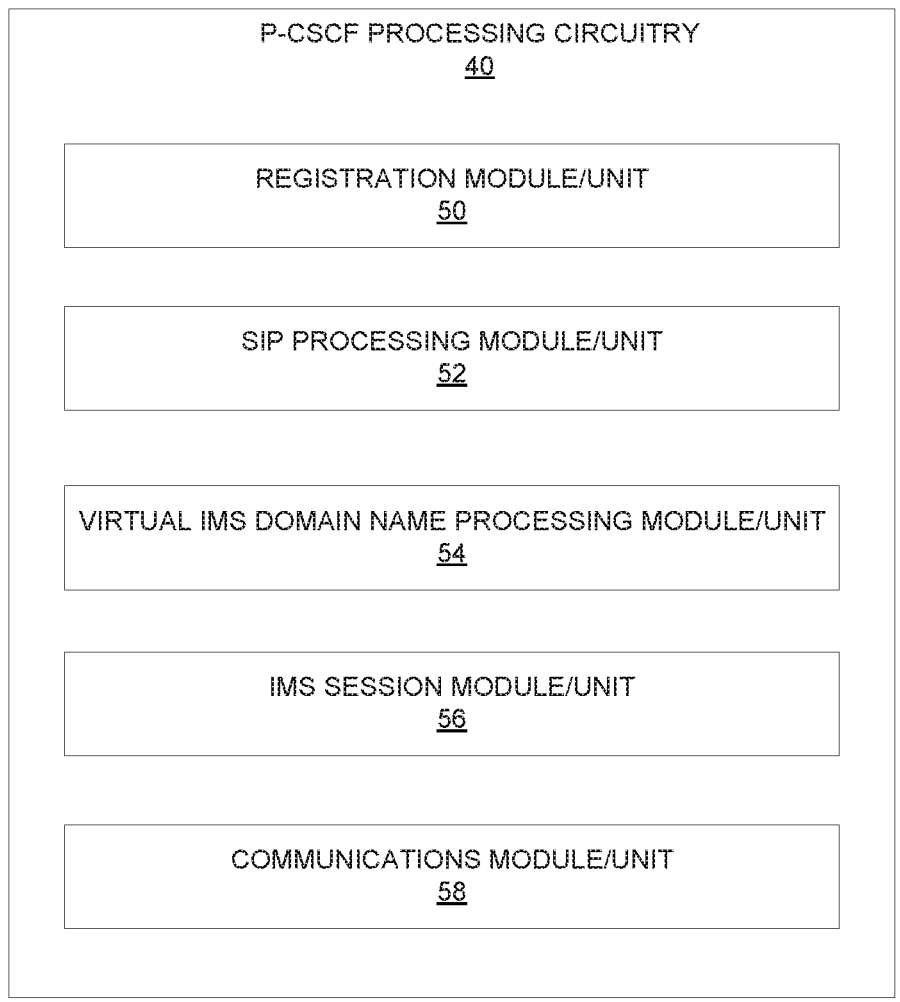
FIG. 7 illustrates a computer program product comprising code executed by the processing circuitry of an IMS node to manage IMS connections according to one embodiment of the present disclosure.

FIG. 7 illustrates the main functional components of an exemplary P-CSCF processing circuitry 40. As above, the main functional components of the exemplary P-CSCF processing circuitry 40 may also be the main functional components of the processing circuitry for an exemplary S-CSCF, according to the present embodiments.

As seen in FIG. 7, processing circuitry 40 comprises a registration module/unit 50, a SIP processing module/unit 52, a virtual IMS domain name processing module/unit 54, an IMS session module/unit 56, and a communications module/unit 58.

The registration module/unit 50 is configured to register the wildcard IMPUs received from EN 12, as previously described. Such registration functions include, but are not limited to, updating registration records at the P-CSCF 24 to map a virtual IMS domain name to an explicit IMS domain name. The SIP processing module/unit 52 is configured to process SIP messages that are received from other nodes in system 10, as well as those that are being sent to other nodes in system 10, as previously described. The virtual IMS domain name processing module/unit 54 is configured to determine whether a virtual IMS domain name received in a message, for example, maps to a corresponding explicit IMS domain name for for a particular IMS domain, as previously described. The IMS session module/unit 56 is configured to establish IMS sessions between the virtual IMS clients 14 at EN 12, and an IMS service provider, such as IMS-1 16 and/or IMS-2 18. The IMS session module/unit 56 is configured to establish these IMS sessions using a virtual IMS domain name received with a session initiation request, while ignoring the explicit IMS domain name, as previously described. Additionally, the IMS session module/unit 56 is configured to terminate the IMS sessions, as previously described. More particularly, in some embodiments, the IMS session module/unit 56 is configured to terminate IMS sessions using a virtual IMS domain name and ignoring the explicit IMS domain name, while in other embodiments, the IMS session module/unit 56 is configured to terminate IMS sessions using the explicit IMS domain name, as previously described. The communications module/unit 58 is configured to send SIP messages to, and receive SIP messages from, one or more other nodes in system 10. The registration module/unit 50, SIP processing module/unit 52, virtual IMS domain name processing module/unit 54, IMS session module/unit 56, and communications module/unit 58 may, according to the present embodiments, be implemented by one or more microprocessors, microcontrollers, hardware, firmware, or a combination thereof.

Figure 8:
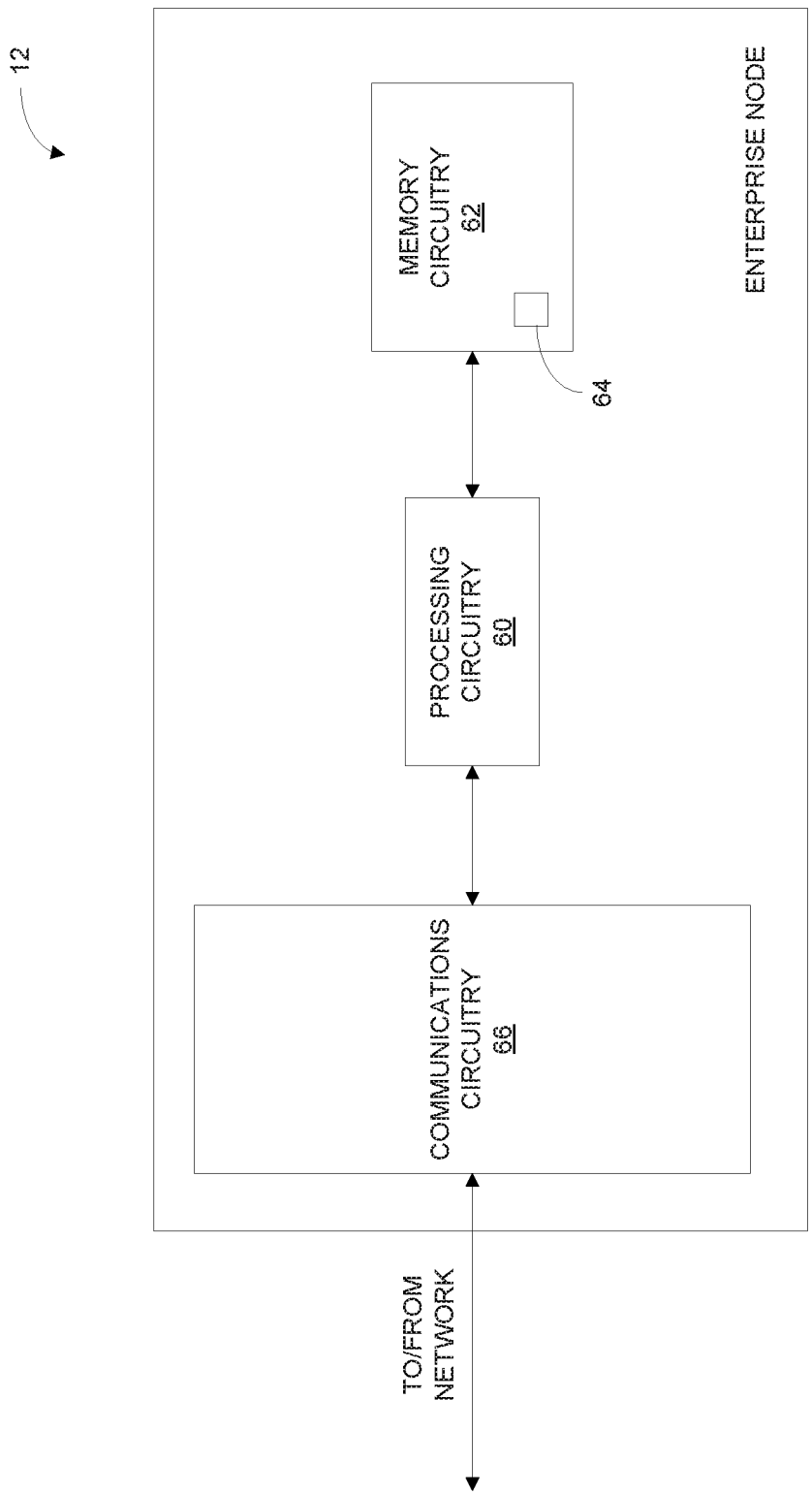
FIG. 8 is a schematic diagram illustrating an enterprise node configured according to an embodiment of the present disclosure.

FIG. 8 is a schematic diagram illustrating an exemplary enterprise node, such as EN 12, configured to operate according to embodiments of the present disclosure. As seen in FIG. 8, EN 12 comprises processing circuitry 60, memory circuitry 62, and communications circuitry 66. The processing circuitry 60 may comprise one or more microprocessors, microcontrollers, hardware circuits, firmware, or a combination thereof, and controls the operation of the EN 12 as herein described. Memory circuitry 62 stores program instructions and data needed by the processing circuitry 60. Permanent data and program instructions executed by the processing circuitry 60, such as control application 64, for example, may be stored in a non-volatile memory, such as a read only memory (ROM), electronically erasable programmable read only memory (EEPROM), flash memory, or other non-volatile memory device. A volatile memory, such as a random access memory (RAM), may be provided for storing temporary data. The memory circuitry 62 may comprise one or more discrete memory devices, or may be integrated with the processing circuitry 60. The communications interface circuitry 66 is configured to send messages to, and receive messages from, one or more other nodes in system 10, such as UE-A 22, P-CSCF 24, and S-CSCF 26.

Figure 9:
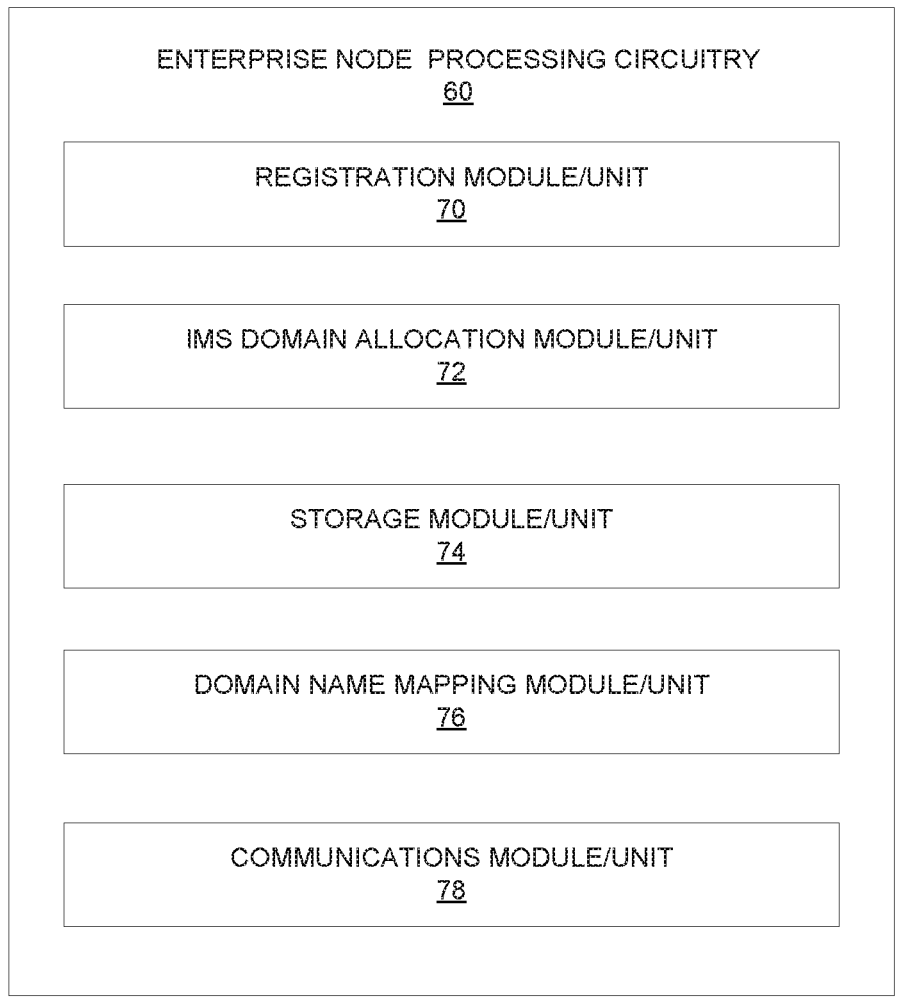
FIG. 9 illustrates a computer program product comprising code executed by the processing circuitry of an enterprise node to manage IMS connections according to one embodiment of the present disclosure.

FIG. 9 illustrates the main functional components of an exemplary processing circuitry 60 for an enterprise node such as EN 12. In particular, as seen in FIG. 9, processing circuitry 60 comprises a registration module/unit 70, an IMS domain allocation module/unit 72, a storage module/unit 74, domain name mapping module/unit 76, and a communications module/unit 78.

The registration module/unit 70 is configured to register the wildcard IMPUs with both the P-CSCF 24 and the S-CSCF 26, as previously described. The IMS domain allocation module/unit 72 is configured to allocate and assign IMPUs to the virtual clients 14, as previously described. In some embodiments, the IMPUs that are allocated and assigned to the virtual IMS clients 14 are sent to the P-CSCF 24 and the S-CSCF 26 in one or more SIP messages, such as session initiation (e.g., SIP INVITE), as previously described. The storage module/unit 74 is configured to store a mapping between the virtual IMS domain names and the explicit IMS domain names, as previously described. In some embodiments, the information and data associated with the mapping is utilized to initiate and terminate the IMS sessions, as previously described. The domain name mapping module/unit 76 is configured to map the virtual IMS domain name to the explicit IMS domain name, as previously described, and the communications module/unit 78 is configured to send SIP messages to, and receive SIP messages from, one or more other nodes in system 10, as previously described. The registration module/unit 70, an IMS domain allocation module/unit 72, a storage module/unit 74, domain name mapping module/unit 76, and a communications module/unit 78 may, according to the present embodiments, be implemented by one or more microprocessors, microcontrollers, hardware, firmware, or a combination thereof.

Figure 10:
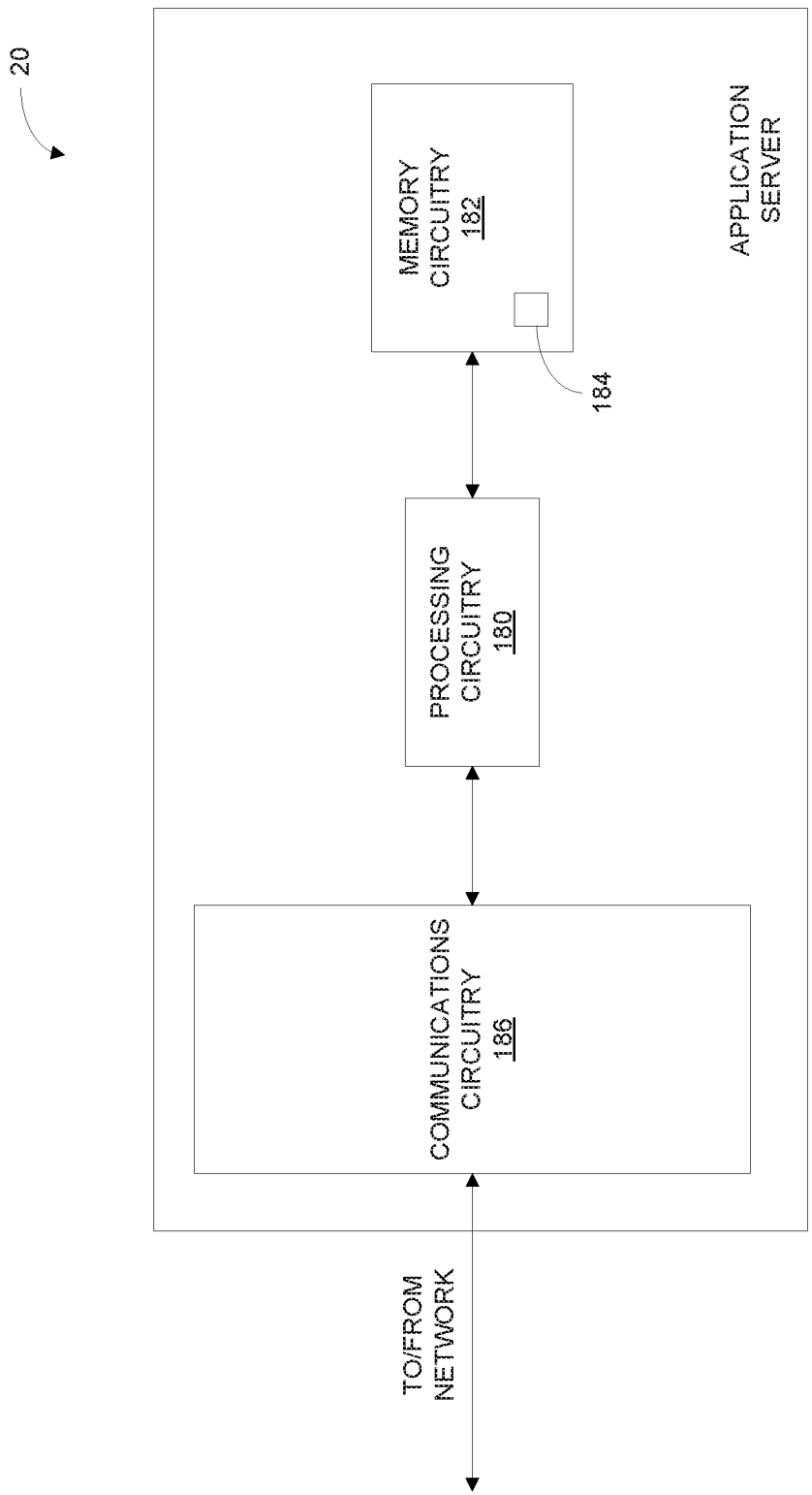
FIG. 10 is a schematic diagram illustrating an application server configured according to an embodiment of the present disclosure.

FIG. 10 is a schematic diagram illustrating an exemplary application server, such as AS 20, configured to operate according to embodiments of the present disclosure. As seen in FIG. 10, AS 20 comprises processing circuitry 180, memory circuitry 182, and communications circuitry 186. The processing circuitry 180 may comprise one or more microprocessors, microcontrollers, hardware circuits, firmware, or a combination thereof, and controls the operation of the AS 20 as herein described. Memory circuitry 182 stores program instructions and data needed by the processing circuitry 180. Permanent data and program instructions executed by the processing circuitry 180, such as control application 184, for example, may be stored in a non-volatile memory, such as a read only memory (ROM), electronically erasable programmable read only memory (EEPROM), flash memory, or other non-volatile memory device. A volatile memory, such as a random access memory (RAM), may be provided for storing temporary data. The memory circuitry 182 may comprise one or more discrete memory devices, or may be integrated with the processing circuitry 180. The communications interface circuitry 186 is configured to send messages to, and receive messages from, one or more other nodes in system 10, such as EN 12, and S-CSCF 26, user devices, such as UE-B 32, and the IMS domains of those user devices, such as UE-B IMS domain 34, as previously described.

Figure 11:
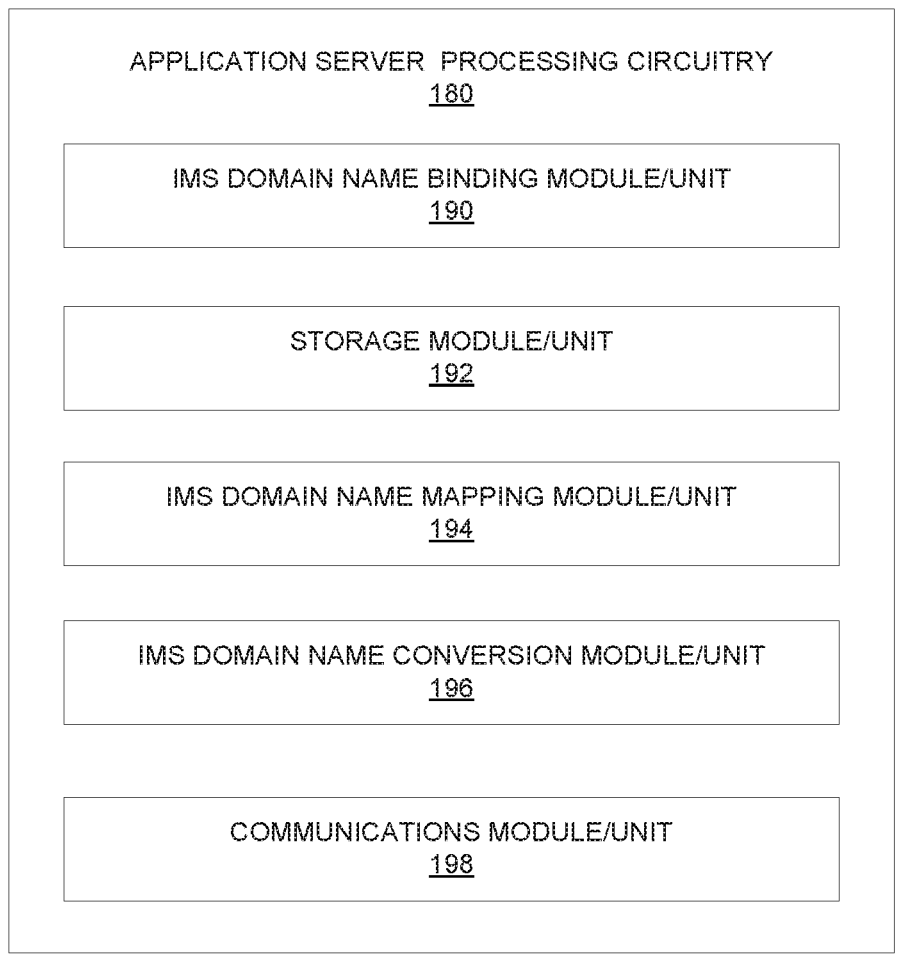
FIG. 11 illustrates a computer program product comprising code executed by the processing circuitry of an application server to manage IMS connections according to one embodiment of the present disclosure.

FIG. 11 illustrates the main functional components of an exemplary processing circuitry 180 for an application server such as AS 20. As seen in FIG. 11, processing circuitry 180 comprises an IMS domain name binding module/unit 190, a storage module/unit 192, an IMS domain name mapping module/unit 194, an IMS domain name conversion module/unit 196, and a communications module/unit 198.

The IMS domain name binding module/unit 190 is configured to bind virtual IMS domain names to explicit IMS domain names, as previously described. The storage module/unit 192 is configured to store those bindings, as previously described. The IMS domain name mapping module/unit 194 is configured to determine a mapping between the virtual IMS domain names and the explicit IMS domain names, as previously described. The IMS domain name conversion module/unit 196 is configured to convert or replace a virtual IMS domain name received with a SIP message with a corresponding explicit IMS domain name, as previously described. The communications module/unit 198 is configured to send SIP messages to, and receive SIP messages from, one or more other nodes in system 10, as previously described. The IMS domain name binding module/unit 190, storage module/unit 192, IMS domain name mapping module/unit 194, IMS domain name conversion module/unit 196, and communications module/unit 198 may, according to the present embodiments, be implemented by one or more microprocessors, microcontrollers, hardware, firmware, or a combination thereof.

What is claimed is:

1. A method of managing Internet Protocol (IP) Multimedia Subsystem (IMS) connections between virtual IMS clients and a plurality of available IMS service providers, the method comprising:
  registering, by an IMS node, a wildcard IMS Public User Identity (IMPU) in a first IMS domain responsive to receiving a registration request message from an enterprise node (EN);
  receiving, by the IMS node, a virtual IMPU assigned to a virtual IMS client of the virtual IMS clients, wherein the virtual IMPU is utilized to originate and receive IMS session data regardless of actual IMS domain, the virtual IMPU comprises a virtual IMS domain name and a username part associated with a username part of the wildcard IMPU,
  the EN serves as a private branch exchange (PBX) and is configured to manage the virtual IMS clients, and the virtual IMS client corresponds to a specific user;
  sending, by the EN, a Session Initiation Protocol (SIP) invite message comprising the virtual IMPU to the IMS node of an allocated IMS service provider to initiate a session with a destination user equipment (UE), wherein an IMS service provider is allocated by the EN to the virtual IMPU used in a session initiation request that was received by the EN from the virtual IMS client comprising the virtual IMPU; and responsive to receiving the SIP invite message, establishing, by the IMS node, an IMS session between the virtual IMS client and the destination UE.

2. The method of claim 1, wherein registering the wildcard IMPU in the first IMS domain comprises storing the wildcard IMPU in a registration record associated with the virtual IMS client.

3. The method of claim 1, wherein the virtual IMS domain name is received from the virtual IMS client in a contact header of a message.

4. The method of claim 1, wherein the virtual IMS domain name is received in a header of a session initiation request message.

5. The method of claim 1, further comprising receiving a session termination request message for the virtual IMS client from an application server, wherein the session termination request message comprises the IMPU assigned to the virtual IMS client, and the virtual IMS domain name.

6. The method of claim 5, further comprising:
determining routing information stored in a registration record associated with the virtual IMS client based on the virtual IMS domain name;
identifying a destination node to which the session termination message is to be routed based on the routing information; and
routing the session request termination message to the destination node.

7. The method of claim 6, wherein the destination node is one of another node in the first IMS domain and the enterprise node.

8. The method of claim 5, wherein the session termination request message comprises the IMPU assigned to the virtual IMS client, and the IMS domain name.

9. The method of claim 8, further comprising:
locating the virtual IMS domain name in a registration record associated with the virtual client based on the IMS domain name received with the session termination request message;
identifying a destination node to which the session termination message is to be routed based on routing information stored in the registration record; and
routing the session request termination message to the destination node.

10. An Internet Protocol (IP) Multimedia Subsystem (IMS) node in a first IMS domain, wherein the IMS node is configured to manage connections between virtual IMS clients and a plurality of available IMS service providers, the IMS node comprising:
communications circuitry configured to communicate with one or more devices via one or more communications networks; and
processing circuitry operatively connected to the communications circuitry and configured to:
register a wildcard IMS Public User Identity (IMPU) in the first IMS domain responsive to receiving a registration request message from an enterprise node (EN);
receive a virtual IMPU assigned to a virtual IMS client of the virtual IMS clients, wherein
the virtual IMPU is utilized to originate and receive IMS session data regardless of actual IMS domain,
the virtual IMPU comprises a virtual IMS domain name and a username part associated with a username part of the wildcard IMPU, the EN serves as a private branch exchange (PBX) and is configured to manage the virtual IMS clients, and
the virtual IMS client corresponds to a specific user;
receive a Session Initiation Protocol (SIP) invite message comprising the virtual IMPU to initiate a session with a destination user equipment (UE), wherein an IMS service provider is allocated by the EN to the virtual IMPU used in a session initiation request that was received by the EN from the virtual IMS client comprising the virtual IMPU; and
responsive to reception of the SIP invite message, establish an IMS session between the virtual IMS client and the destination UE.

11. The IMS node of claim 10, wherein the processing circuitry is further configured to store the wildcard IMPU in a registration record associated with the virtual IMS client.

12. The IMS node of claim 10, wherein the processing circuitry is further configured to receive the virtual IMS domain name from the virtual IMS client in a contact header of a message.

13. The IMS node of claim 10, wherein the virtual IMS domain name is received in a header of a session initiation request message.

14. The IMS node of claim 10, wherein the processing circuitry is further configured to receive, from an application server, a session termination request message for the virtual IMS client.

15. The IMS node of claim 14, wherein the session termination request message comprises the IMPU assigned to the virtual IMS client, and the virtual IMS domain name.

16. The IMS node of claim 15, wherein the processing circuitry is further configured to:
determine routing information stored in a registration record associated with the virtual IMS client based on the virtual IMS domain name;
identify a destination node to which the session termination message is to be routed based on the routing information; and
route the session request termination message to the destination node.

17. The IMS node of claim 15, wherein the session termination request message comprises the IMPU assigned to the virtual IMS client, and the IMS domain name.

18. The IMS node of claim 17, wherein the processing circuitry is further configured to:
locate the virtual IMS domain name in a registration record associated with the virtual client based on the IMS domain name received with the session termination request message;
identify a destination node to which the session termination message is to be routed based on routing information stored in the registration record; and
route the session request termination message to the destination node.

19. The IMS node of claim 10, wherein the IMS node comprises one of a Proxy-Call Session Control Function (P-CSCF) or a Serving-Call Session Control Function (S-CSCF).

20. A system for managing connections between one or more virtual Internet Protocol (IP) Multimedia Subsystem (IMS) clients and a plurality of available IMS service providers, the system comprising:
an IMS node in a first IMS domain; and
an enterprise node (EN) comprising first processing circuitry configured to:

communicatively connect to the IMS node in the first IMS domain; and send a registration request message to the first IMS domain to register a wildcard IMS Public User Identity (IMPU), wherein the IMS node in the first IMS domain comprises second processing circuitry that is configured to:

register the wildcard IMPU in the first IMS domain responsive to receiving the registration request message from the EN;

receive a virtual IMPU assigned to a virtual IMS client of the one or more virtual IMS clients, wherein the virtual IMPU is utilized to originate and receive IMS session data regardless of actual IMS domain, the virtual IMPU comprises a virtual IMS domain name and a username part associated with a username part of the wildcard IMPU, the EN serves as a private branch exchange (PBX) and is configured to manage the virtual IMS clients, and the virtual IMS client corresponds to a specific user;

wherein the first processing circuitry is configured to send a Session Initiation Protocol (SIP) invite message comprising the virtual IMPU to the IMS node of an allocated IMS service provider to initiate a session with a destination user equipment (UE), wherein an IMS service provider is allocated by the EN to the virtual IMPU used in a session initiation request that was received by the EN from the virtual IMS client comprising the virtual IMPU, and wherein the IMS node in the first IMS domain is configured to establish, in response to receiving the SIP invite message, an IMS session between the virtual IMS client and the destination UE.

* * * * *